June 25, 1957 E. KAISER 2,796,954
BRAKE ANTI-FRICTION INSERT
Filed Jan. 5, 1955 2 Sheets-Sheet 1

E. KAISER
INVENTOR.

BY
ATTORNEYS

June 25, 1957 E. KAISER 2,796,954
BRAKE ANTI-FRICTION INSERT

Filed Jan. 5, 1955 2 Sheets-Sheet 2

E. KAISER
INVENTOR.
BY
ATTORNEYS

United States Patent Office 2,796,954
Patented June 25, 1957

2,796,954

BRAKE ANTI-FRICTION INSERT

Edward Kaiser, Birmingham, Mich., assignor to Ford Motor Company, Dearborn, Mich., a corporation of Delaware Application January 5, 1955, Serial No. 480,000

3 Claims. (Cl. 188—78)

This invention relates to brakes and more particularly the internal expanding drum type brakes adapted for use with automotive vehicles.

Prior to this invention, it was a common practice for the brake shoes to rest against a number of ledges, usually two or three to a brake shoe, located at pre-determined points on the brake shoe supporting (backing) plate and positioned against lateral movement by the use of spring hold down means. Ordinarily, a white grease was used to aid in lessening the friction between the brake shoe and the backing plate when the brakes were applied and the shoes moved across the ledges of the backing plate. Friction, however, was still prevalent even though the grease was used and a very annoying and irritating noise sometimes resulted from a somewhat slower brake action. Another more serious problem occurred, however, during normal and in particular emergency quick-stop brake applications. In the usual brake mechanism (and especially so in a duo-servo type brake) there is set up at the time the lining contacts the brake drum, a twisting or torque force to both the shoes and the brake backing plate causing the shoes to sometimes cut or shear their way across the brake ledges. Especially is this true today where the stamped backing plate is used in most brake designs. Aided by the lateral spring hold down means employed in most brakes, a "hanging-up" of the brake shoe and/or uneven brake application would occur. As a consequence of the uneven ledges, a limited portion of application power to the friction lining would take place and result in an uneven wear of the lining. Replacement of the backing plate, an expensive procedure would then be necessary with no assurance that the "cause" had been eliminated.

This invention insures an efficient application of the brake, with a more equal distribution of lining wear and the abolition of brake shoe noise by the use of an anti-friction insert between the brake backing plate ledges and the brake shoe.

One of the objects of this invention is to provide means by which brake shoe energization will be substantially improved, thus bringing maximum power to the brake lining and quicker contact with the brake drum.

Still another object is to bring about more quickly a greater surface of the brake lining into contact with the brake drum to equalize wear and lessen the pedal force required to bring the brake friction lining in contact with the brake drum.

Still another object is to provide a means whereby the squeal or noise caused by the metal to metal contact of the brake shoe and the brake backing plate ledge will be completely obviated.

Still another object is to provide a simplified means of attaching an insert to the brake shoe to allow for ease in both manufacture and assembly.

Other objects and advantages of this invention will be made more apparent as this description proceeds, particularly when considered in connection with the accompanied drawings wherein.

Figure 1:
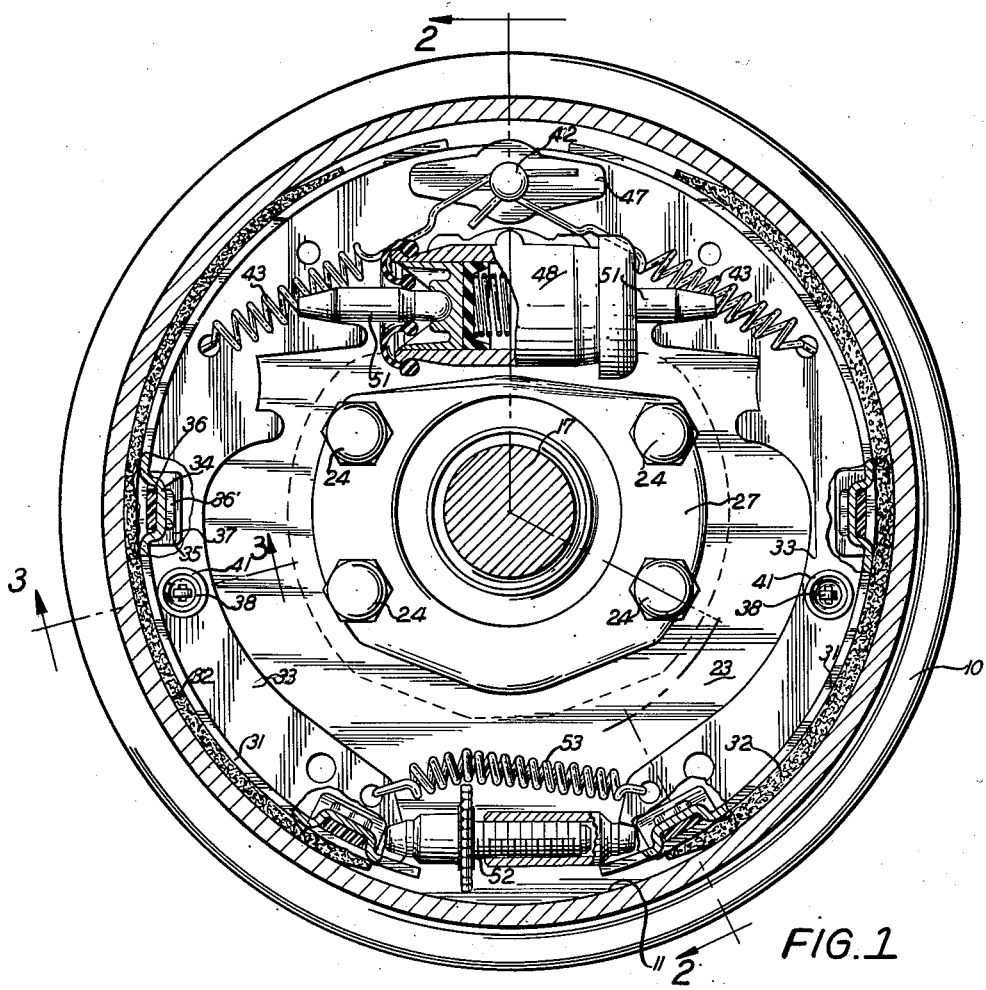
Figure 1 is a side elevation partly in section showing a brake assembly incorporating this invention.

Referring to the drawings, a rotatable brake drum 10 having a cylindrical braking area 11 is fixedly mounted to flange 12 of the wheel hub 13 by a plurality of bolt means 14 which serve to retain the wheel disc. A conventional front wheel and spindle arrangement is shown used here, but it is to be understood that the invention is usable on any brake in any preferred location and in any use be it vehicular or industrial. Spindle 16 is integral with the steering knuckle 17 and is rotatably mounted in forks 18 of the spindle support by means of kingpin 19. Spindle 16 is journaled in the hub 13 by means of bearings 21 and 22 about which the brake drum and hub rotate.

Turning to the brake itself, a combined backing plate and sealing cover 23 is secured by a plurality of bolt means 24 to the face 26 of the steering knuckle 17. A baffle plate 27 is retained by the same bolt means 24 for sealing out grease and other foreign matter. Backing plate 23 serves as the support member for the brake details and is usually constructed from a substantial steel stamping embodying depressed ribbing for structural strength. In addition to the ribbing, there are cutaway areas in the plate 23 of a circular and noncircular nature and raised sections which are hereinafter explained. The peripheral edge 28 of the backing plate 23 is press formed to provide in cooperation with radial slot 29 of the brake drum 10, a labyrinth type water and dust trap.

Figure 3:
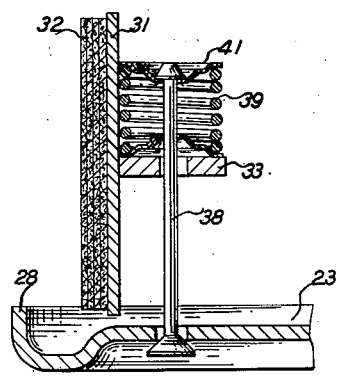
Figure 3 is a cross section taken on line 3—3 of Figure 1.
Figure 4:
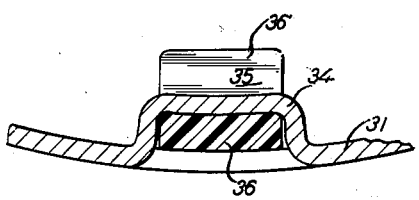
Figure 4 is a cross section enlargement of the invention.
Figure 2:
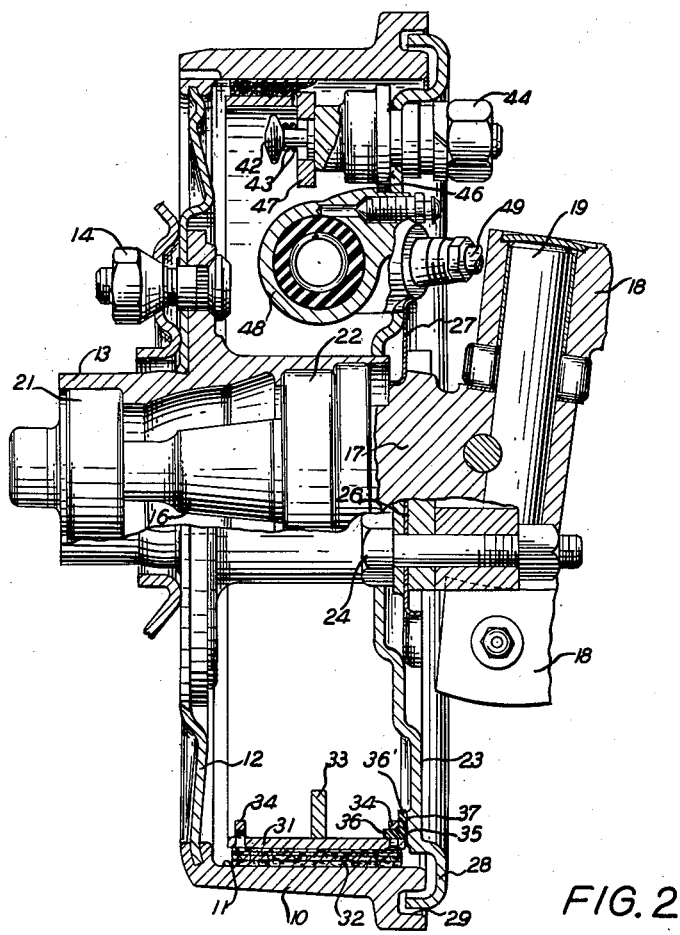
Figure 2 is a cutaway section taken on line 2—2 of Figure 1.

The working parts of the brake may consist of two T-section brake shoes each consisting of a rim 31 provided with a friction lining 32 and a strengthening web 33 which is located in the center of rim 31. The rim 31 may be lanced inwardly of the friction lining surface and parallel to the strengthening web 33 to form an integral bridge 34. In the particular construction shown, the bridge 34 is located at a point inward of the rim edge and are four in number—two for each shoe located near the midpoint and end of each brake shoe and in a superimposed relationship to ledges 37 formed in the backing plate 23. Projecting through each bridge 34 on the side of the web nearest to the backing plate 23 is an L-shaped anti-friction insert 35 having an axially extending leg 36 extending through and confined from lateral movement by the bridge 34 and having a radially extending foot 36' having its topmost surface in contact with the side of the bridge nearest the backing plate and its opposite side in friction contact with the adjacent ledge 37. Said foot 36' is formed at a right angle to leg 36 and is in parallel relationship to both bridge 34 and ledge 37. In the particular construction shown, two ledges are provided for each shoe. The shoes are yieldably secured from lateral movement by a spring hold down arrangement shown in Figure 3 which also serves to maintain a constant pressure on the insert 35 against the ledges 37. A hold down spring pin 38 having a half rounded head and a T-shaped end is extended through holes in the backing plate 23 and the brake web 33 and thereon through coil spring 39 and cap 41. A suitable recess is provided in cap 41 at a right angle to the hole located therein. Upon the compression of the spring 39 and the suitable rotation of pin 38, the T-head of the pin 38 is positioned in the recess, thus effectively locking the parts together and maintaining a constant lateral pressure of the brake shoe (by insert 35) on the backing plate 23. As can be seen, the insert 35 will be suitably held in position without additional anchoring or attachment means. At the upper end of this brake which is of the duo-servo design, the shoes are urged against an anchor 42 by return springs 43 secured at one end to the shoe and at the other end to the anchor 42. The webs 33 of the shoe ends are notched to embrace the anchor 42. An eccentric hole in the backing plate 23 through which the anchor 42 is inserted effectively prevents radial movement. In view of the application of torque against the anchor bolt 42, it is necessary to supplement the brake backing plate 23 with a supporting member 46 which is integral with the backing plate 23 by weld means. The brake shoe anchor pin plate 47 is placed over the anchor pin 42 and rests on the shoulder of the pin 42 effectively providing a substantial restraining surface against the brake webs 33 and preventing lateral movement of the brake shoe at this point when held in place by springs 43. Directly under the anchor 42 and positioned between the two brake shoes and fixedly secured to the brake backing plate 23 by bolt means not shown herein is a conventional type hydraulic actuator or wheel cylinder 48. Brake fluid under pressure from a source of supply (not shown) is directed to the actuater 48 by conduit means 49 moving the brake shoes outwardly by means of links 51 into contact with the braking area 11. From the drawings it is obvious that only the bridge 34 nearest the backing plate 23 is used at any one time. In manufacturing the brake shoes it has been found that in many instances they may be interchangeable, thus bridges 24 may be provided on both sides of the web 31 as shown in Figure 2. In the fabrication of the insert 35, a high heat resistant nylon has been found to be very satisfactory in this application for wear qualities. For additional lubrication qualities, a graphite impregnated nylon insert may be used.

At the opposite end of the brake shoe, the brake shoe webs 33 have positioned between them a conventional star-wheel operated adjusting link 52 whose outer ends are forked to straddle the webs 33 and rest upon the rim 31. A tensioning spring 53 is connected to both ends of the shoes and positioned atop the star-wheel maintaining the units in an adjustable rigid thrust link while yieldably maintaining the star-wheel in asset position. An appropriate hole in the backing plate 23 (not shown herein) and usually covered by a conveniently removable rubber gromet (also not shown) is located in a fixed relationship to the star-wheel for the purpose of adjusting the brake shoes without the necessity of removing the brake drum.

Figures 5, 6:
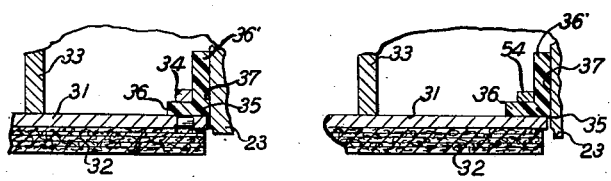
Figure 5 is an enlargement of the side view of the invention taken on line 2—2 of Figure 1.
Figure 6 is a modification of the invention.

An alternate form of bridging may be used by the welding of a strip of preformed bridging 54 onto the brake shoe rim 31 as shown in Figure 6.

It is obvious that there are many methods of securing said inserts to the brake shoes which, although not shown here, necessarily come within the scope and spirit of this invention and claims. Although a duo-servo brake structure is shown here, the invention may be incorporated in any brake structure which maintains the brake shoe in a friction engagement with the brake backing plate.

What is claimed is:

1. A brake comprising in combination a rotatable drum, a backing plate mounted adjacent to said drum, a plurality of brake shoes mounted upon said backing plate, actuating means for expanding said shoes into friction contact with said drum, said backing plate having a plurality of circumferentially spaced ledges at equal radial distances from the axis of the backing plate, antifriction inserts, mounting means on said brake shoes for mounting said inserts to said brake shoes in positions in alignment with said ledges, said inserts being interposed between said brake shoes and said ledges and maintaining said brake shoes in parallel alignment with said backing plate and resilient means urging said brake shoes toward said backing plate and keeping said inserts in friction contact with said ledges.

2. In a hydraulic brake structure for use in automotive vehicles in combination with a rotatable drum, a backing plate mounted adjacent to said drum, a plurality of T-shaped brake shoes having friction liners attached thereto, a hydraulic actuator attached to said backing plate and actuating one end of said shoes into friction contact with said drum, an adjustable thrust link connecting said brake shoes at the other end, said backing plate having a plurality of circumferentially spaced ledges at equal radial distances from the axis of the backing plate, an inwardly bowed integral bridge formed in said rims of the T-shaped brake shoes on the side adjacent to the backing plate, an anti-friction insert having a radially inwardly extending arm projecting through the underside of said integral bridge, said bridge maintaining an inner configuration to hold said insert secure from substantial lateral movement, an axially extending arm at right angles to said radial arm and said ledges, said inner side of said arm abutting the integral bridge and said outer side in friction contact with the ledges, said inserts maintaining the brake shoes in parallel alignment with said backing plate, and resilient means urging said brake shoes toward said backing plate and maintaining said inserts in continuous friction contact with said ledges.

3. In a duo-servo brake comprising in combination a rotatable drum, a backing plate fixedly secured to said drum, a pair of T-shaped brake shoes mounted within said drum and having a friction lining secured to it for positioning against said drum, a hydraulic brake cylinder secured to said backing plate and actuating said shoes at one end, floating adjustable connector means at the other end, a plurality of raised circumferentially spaced ledges at equal radial distances from the axis of said backing plate and at pre-determined radial locations in alignment with the travel of said brake shoes, a plurality of rectangular strips of metal with raised medial sections fixedly secured at both outer ends to said brake shoe and forming a bridge thereto and equal in number to said ledges and secured at pre-determined positions to said shoes in alignment with said ledges, substantially L-shaped anti-friction inserts having one extension projecting through and contained by said bridge from substantial lateral movement and having the other extension in friction contact with said ledges, spring means urging said shoes and inserts against said ledges and maintaining the shoes in a plane parallel to said backing plate and effectively maintaining said insert in said bridge.

References Cited in the file of this patent

UNITED STATES PATENTS

| 1,908,410 | Dodge | May 9, 1933 |
| 2,211,439 | Schnell et al. | Aug. 13, 1940 |
| 2,294,329 | Ayers et al. | Aug. 25, 1942 |
| 2,418,848 | Perrot | Apr. 15, 1947 |
| 2,509,643 | House | May 30, 1950 |